United States Patent [19]
De Coene

[11] 3,857,400
[45] Dec. 31, 1974

[54] COMBINE HARVESTER
[75] Inventor: Frans J. G. C. De Coene, Zedelgem, Belgium
[73] Assignee: Clayson N.V., Zedelgem, Belgium
[22] Filed: Oct. 20, 1972
[21] Appl. No.: 299,474

[52] U.S. Cl. ............................ 130/27 T, 130/27 Q
[51] Int. Cl. .............................................. A01f 7/06
[58] Field of Search ..... 130/27 T, 27 F, 27 R, 27 P, 130/27 Q

[56] References Cited
UNITED STATES PATENTS

| | | | |
|---|---|---|---|
| 1,534,690 | 4/1925 | Curtis | 130/27 F |
| 2,255,193 | 9/1941 | Steelman | 130/27 F |
| 3,529,645 | 9/1970 | Murray et al. | 130/27 T |
| 3,593,719 | 7/1971 | Ashton | 130/27 T |
| 3,626,472 | 12/1971 | Rowland-Hill | 130/27 T |

Primary Examiner—Russell R. Kinsey
Attorney, Agent, or Firm—Louis J. Virelli, Jr.; Frank A. Seemar; John R. Flanagan

[57] ABSTRACT

The present invention is directed to a combine harvester comprising a threshing and separating means of the axial flow type, and a cleaning means extending in a generally fore-and-aft direction of the combine beneath the threshing and separating means and positioned in such a way as to prevent any disruptive air currents from being formed and interferring with the operation of the cleaning means.

9 Claims, 13 Drawing Figures

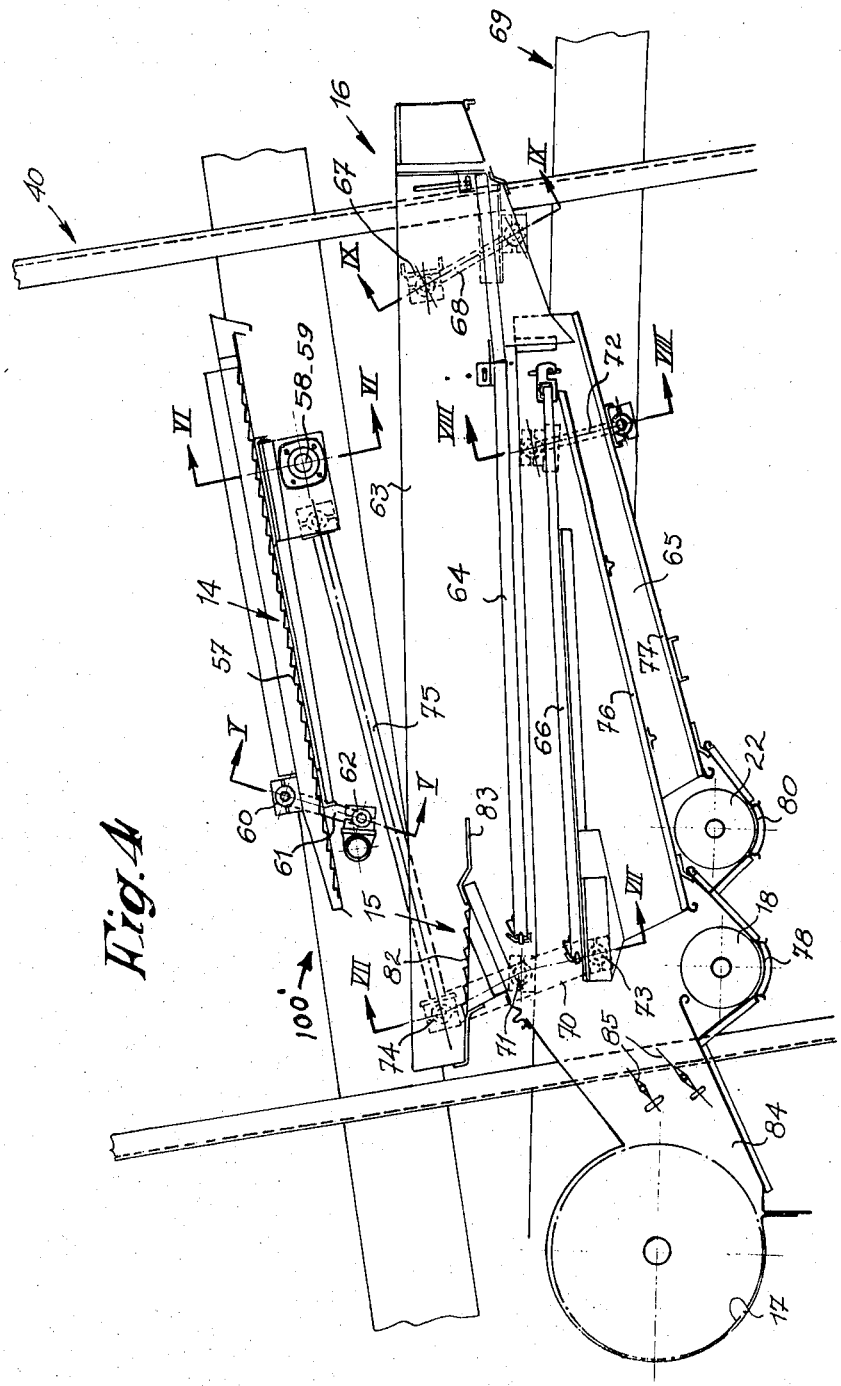

COMBINE HARVESTER

BACKGROUND OF THE INVENTION

1. Field of the Invention

This invention relates to combine harvesters (combines) and has for its main object the provision of a combine the various components of which are arranged in such a way as to prevent any disruptive air currents from being formed and interferring with various operations of the combine. The invention particularly relates to axial flow type combine harvesters wherein the threshing and separating means are of the axial flow type. By threshing and separating means of the axial flow type is meant rotary threshing and separating means having its axis of rotation extending generally fore-and-aft of the combine so that, in use, crop material flows in a spiral path axially of the means in passing from the input end to the discharge end.

2. Description of the Prior Art

It has been known in the art to provide combine harvesters with a forward header and crop elevator, a middle threshing cylinder, a concave, rearward straw walker and a straw hood. The grain cleaning means normally extends in a generally fore-and-aft direction beneath the threshing means and the straw walkers and comprises a relatively long forward grain pan and rearward cleaning sieves. This type of configuration (for conventional combines) performed adequately, but necessitated the construction of a very large and cumbersome machine. Further, this configuration allowed the air currents generated by the threshing cylinder to interfere with the stream of air, which operates as part of the cleaning operation to remove impurities contained in the grain, thereby interferring with the overall cleaning operation.

The arrangement of the various components of axial flow combines is generally the same as in conventinal combines. The only major difference is that the collecting grain pan and the cleaning receptacles are arranged generally beneath and to the rear of the threshing and separating means of an axial flow type combine.

This configuration, of the cleaning receptacles, creates in an axial flow combine even more pronounced disruptive air currents than in conventional combines since the rotor of the threshing and separating means produces a more intense air current than the conventional cylinders. Further, the positioning of the threshing means, above and forwardly of the cleaning receptacles creates greater intermingling of air streams than with conventional combines. Since it has been found that evan a small variation in the performance of the cleaning means (which include the cleaning receptacles) cause a large amount of grain to be lost, it is of the utmost importance to eliminate as many disruptive forces as possible.

OBJECTS AND SUMMARY OF THE INVENTION

It is therefore the principle object of the present invention to provide an axial flow combine having its components arranged in such a way as to prevent any disruptive air currents from being formed and interferring with the various operations of this type of combine.

More particularly, it is the object of the present invention to provide an axial flow combine in which the air currents generated by the rotors of the threshing and separating means will not interfere with the air stream utilized in the grain cleaning operation, thereby eliminating any disruptive air currents which may be formed during the cleaning operation.

Another of this invention is to provide an axial flow combine in which the overall dimensions of the machine are reduced.

A further object of this invention is to provide an axial flow combine having components which are easily accessible to the operator.

The present invention is directed to a combine harvester comprising threshing and separating means, of the axial flow type, and a cleaning means extending in a generally fore-and-aft direction of the combine directly beneath the threshing and separating means and positioned in such a way as to prevent any disruptive air currents from being formed and interferring with the various operations of the combine.

BRIEF DESCRIPTION OF THE DRAWINGS

FIG. 4 is an enlarged schematic view of the structure included in the area encompassed by broken line F4 in FIG. 1.

DESCRIPTION OF THE PREFERRED EMBODIMENT

General

Figure 1:
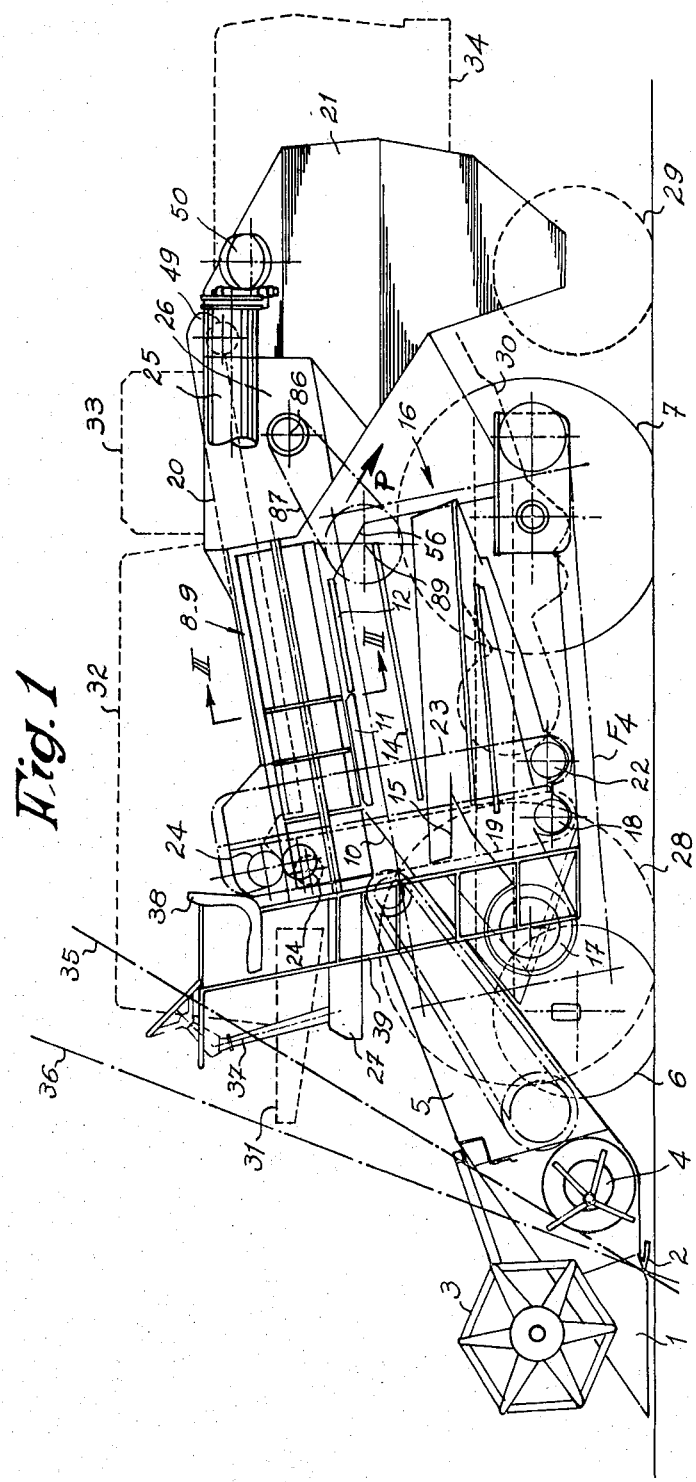
FIG. 1 is a schematic side elevational view illustrating the arrangement of the different parts of the combine according to the invention.

As shown in FIG. 1 the combine according to the invention comprises a header 1 with a cutting or mowing device 2, a reel 3, an auger 4, and a crop elevator 5 provided behind the header 1. A pair of front wheels 6 are steered and a pair of larger rear wheels 7 are driven, only one wheel of each pair being shown.

Figure 3:
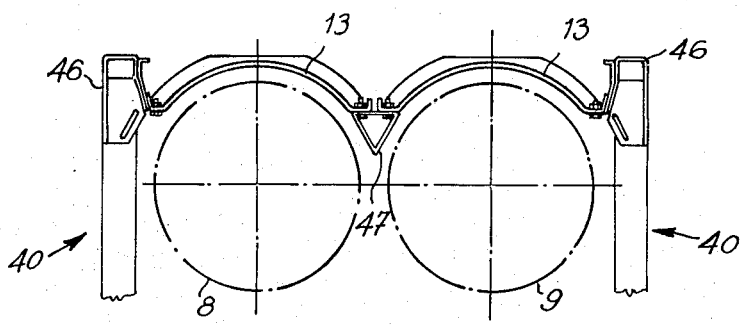
FIG. 3 is an enlarged schematic sectional view taken along line III—III of FIG. 1.
Figure 5:
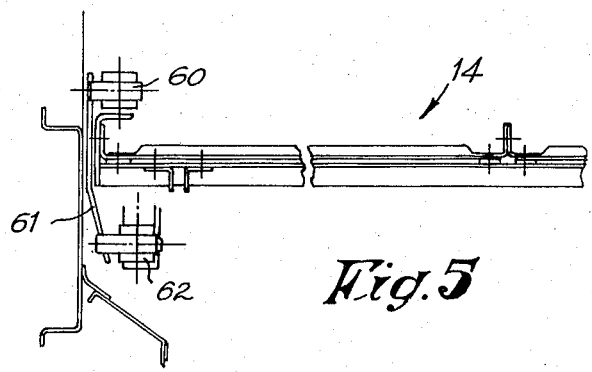
FIG. 5 is a sectional view taken along line V—V of FIG. 4.

A pair of combined threshing and separating units of the axial flow type are provided in side-by-side relationship extending substantially fore-and-aft of the combine. In each unit the separating section is located rearwardly of the threshing section and the respective rotors 8, 9 are shown in FIG. 3. The rotors 8, 9 are mounted in respective cylindrical housings which at their lower forward ends join a feed or guide ramp 10, which in turn joins the crop elevator 5, the ramp thus feeding the crop directly to the rotors 8 and 9 from the elevator. A threshing concave 11 is provided below the threshing unit, and a separating concave 12 is located below the separating unit. Above each rotor 8, 9 a removable cover 13 is provided which forms the top or highest point of that part of the combine.

Located beneath the threshing and separating units is the cleaning means 100'. The cleaning means includes an inclined collector grain pan 14 which controls the movement and direction of grain falling from the threshing and separating units. This grain pan controls and conveys the grain towards the front of the combine and then delivers the grain to a transfer pan 15. This transfer pan controls the movement and direction of the grain and finally delivers the grain to cleaning area 16. The cleaning area 16 is located in the extreme forward position of the combine as compared with the rearward position of the cleaning area in a conventional combine.

After having been treated in the cleaning area 16, in a manner to be explained hereinafter, the grain is fed to a clean grain auger 18 which transfers it to a grain elevator 19, the upper end of the latter being in a grain transfer relationship with a rearwardly extending grain conveyor 20, which takes the grain to a grain tank 21 located at the rear end of the combine. Such tailings as are segregated in the cleaning area 16 are fed back into the threshing units by a tailings auger 22, a tailings elevator 23, and a tailings distributing auger 24.

The grain tank 21 is provided with a discharge tube 25, only partially shown in the drawings, which can either be held in a retracted position for road transport, as illustrated in FIG. 1, or can be moved into an operative position in order to transfer the grain from the tank 21 into a trailer or the like placed alongside the combine or a silo. The wheels 7 and the other driven components of the combine are driven by an engine (not shown) mounted in space 26 (FIG. 1), i.e., in the space between the rear end of the threshing and separating units and the grain tank 21. In front of the threshing and separating units and above the crop elevator 5, the operator's deck or platform 27 is provided.

FIGS. 2 to 13 schematically show embodiments and positioning of the different components of the combine which will prevent any disruptive air currents from being formed and interferring with varous operations of this type combine as well as providing for a more compact combine.

As already mentioned, the header 1, cutting device 2, reel 3 and the header auger 4, as well as the crop elevator 5, are identical to those described above. The operator's platform 27 is provided with a steering column 37, an operator's seat 38, and a ladder 39 displaced towards the rear of the front wheels. This type of configuration enables the operator to have a considerably improved view of the header, since his line of sight indicated by line 35 is more horizontal than with previous designs.

Owing to the fact that, in spite of its lower position with respect to a conventional machine, the operator's platform 27 is on top of the combine, the driving of such a machine, particularly on the public road or when driving in reverse, is very much simplified.

Figure 2:
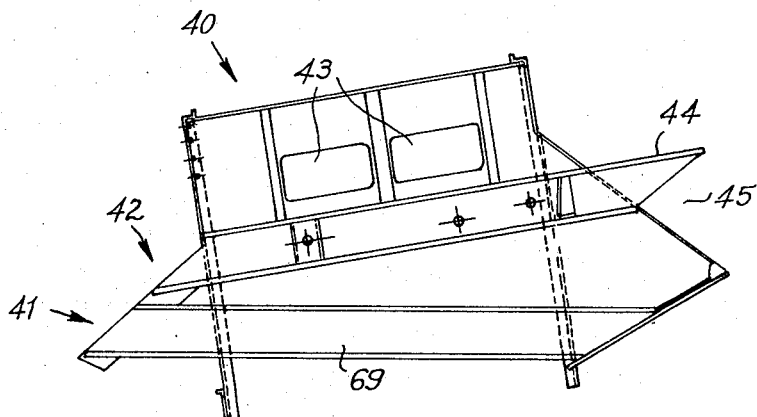
FIG. 2 is a schematic side elevational view of the main frame or chassis of the combine constructed in accordance with the invention.

A frame or chassis 40 of the combine has been shown in FIG. 2 schematically in side elevation. This frame presents a lower forwardly extending projection 41 on which the steerable wheels are mounted. At a point above this projection, the crop elevator 5 is connected to the frame in such a way that, in the working position, the lower side of the crop elevator 5 lies a short distance above the upper portion 42 of the frame 40. In both side walls of the frame 40, openings 43 are provided through which access to the threshing and separating units may be gained from the sides of the machine. At its rear end the frame 40 is provided with a supporting member 44 for the driving engine, and a recess 45 adapted to receive a projecting part of the grain tank 21, as will appear from the description hereinafter.

The rotors 8 and 9 can be of any axial flow type and will not be described in more detail. The housings for the rotors (not shown in the drawing) are mounted on the frame, the aforementioned covers 13 being fixed each on a longitudinal side beam 46 and on a middle beam 47 of the frame. The covers 13 are each provided, adjacent the threshing and separating units, with flights or fins (not shown) operable to guide crop material generally axially, as well as circumferentially, through the units.

As is apparent from FIG. 1, the tailings return auger 24 is mounted above the front part of the covers 13 in order to feed the tailings via two openings (not shown), one in each cover 13, back to the threshing and separating units. In an alternative embodiment, the tailings auger 24 passes through one side wall 40 of the machine, and extends into the housing of one of the rotors in order to feed the tailings directly to one of the rotors.

The guide or feed ramp 10, as well as the threshing concaves 11 and separating concaves 12, can be of any well-known type.

Figure 10:
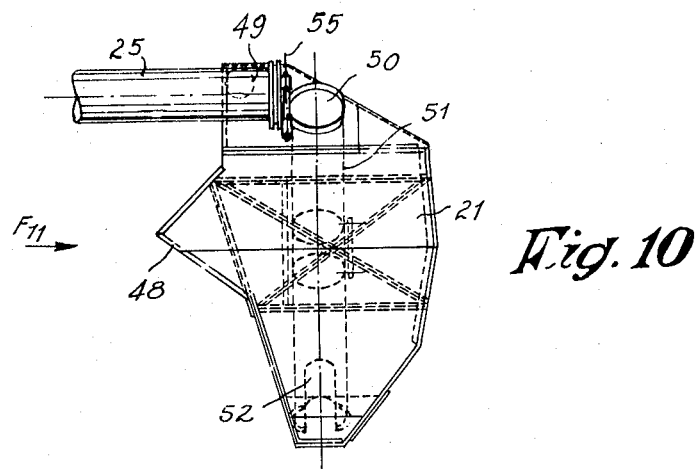
FIG. 10 is a side elevational view of a grain tank of the combine of FIG. 1.
Figure 11:
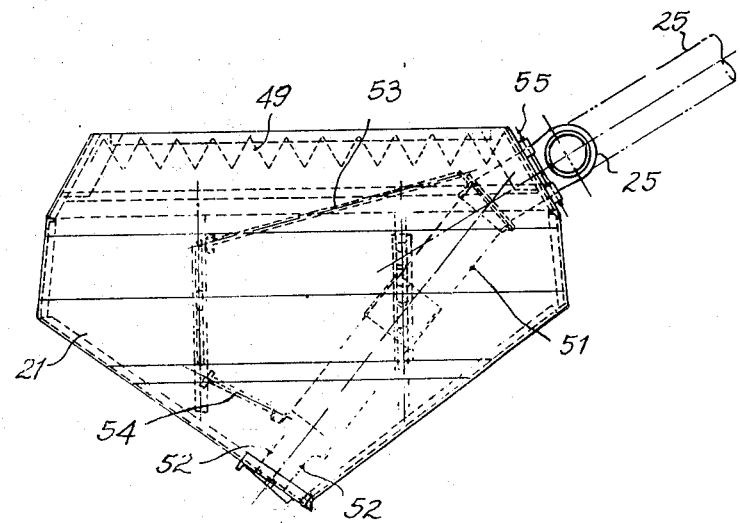
FIG. 11 is a view according to the arrow F11 of FIG. 10.

The grain tank 21, shown in more detail in FIGS. 10 and 11, has such a shape that, in spite of its relatively short length compared with that of the combine, it has at least the same capacity as the grain tank of a combine having a conventional grain tank arrangement. On its front wall, the grain tank 21 has a projection 48 that fits in the corresponding recess 45 of the frame 40. The tank 21 is relatively tall and the lower part thereof is near to the ground so as to provide the same capacity as grain tanks of conventional shape, but with a considerably reduced dimension in the longitudinal direction of the combine. With a taller and narrower grain tank, there is provided a solution to the problem of uniform filling of the tank, since a grain distributing auger 49 can be provided to better distribute the grain in the tank.

In order to empty the grain tank 21, a discharge tube 25 can be swung into a coaxial position with respect to the axis of an opening 50 provided in the grain tank. This opening 50 is extended into the inside of the tank 21 by a fixed part or tube 51 directed towards the lowest point of the grain tank and provided with suitable openings 52. The tube 51 is supported within the grain tank by supporting members or struts, not shown.

It will be understood that in the discharge tube 25 as well as the fixed tube 51, an auger or conveyor screw (not shown) is provided; it will also be understood, that the auger provided in the fixed tube 51 is made in two parts which are connected together by a universal joint or the like at the bend in the tube 51, whereas at the place where the fixed tube 51 and the discharge tube 25 are to be coupled together, the spindles of the respective augers are adapted for mutual engagement. The discharge tube 25 itself hinges on an axis 55, so as to be able to be moved from a retracted position to an operative position or vice versa.

On account of the low position of the grain tank 21 of the operator from his seat has a considerably improved view of the surrounding parts of the machine and the general environment.

CLEANING DEVICE

The cleaning means 100' is virtually the same as that used in a conventional combine, subject to minor adaptations. The cleaning means more particularly in FIGS. 4 to 9. As appears from FIG. 1, behind the separating concaves 12 there is provided an inclined guide plate 56 over which the straw moves rearwardly and out of the combine in the direction of the arrow P, the bottom wall of a casing for the engine and the front wall of the grain tank 21 defining the straw discharge passage. Check flaps or baffles may be provided on the front wall of the grain tank 21 to spread the discharged straw.

Figure 6:
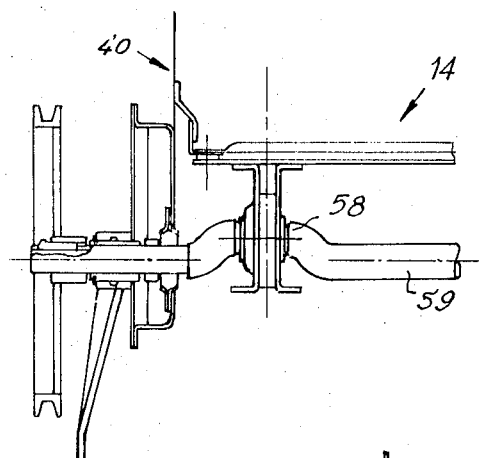
FIG. 6 is a sectional view taken along line VI—VI of FIG. 4.
Figure 8:
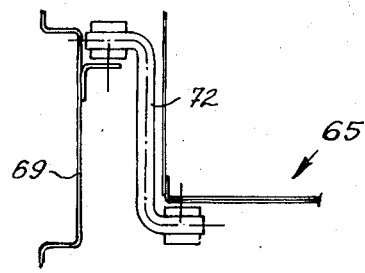
FIG. 8 is a sectional view taken along line VIII—VIII of FIG. 4.
Figure 7:
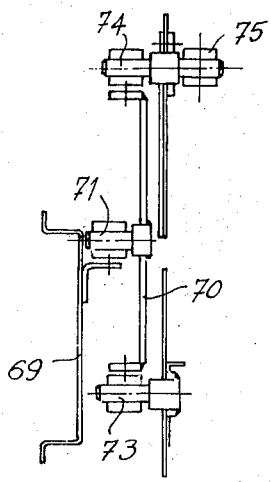
FIG. 7 is a sectional view taken along line VII—VII of FIG. 4.
Figure 9:
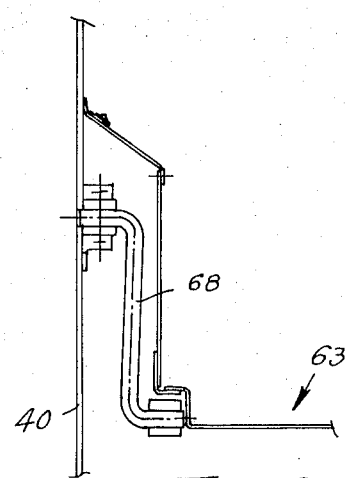
FIG. 9 is a sectional view taken along line IX—IX of FIG. 4.

The grains separated in the threshing and separating unit are collected, together with small impurities, on the collector grain pan 14. The latter mainly comprises an impervious corrugated surface having step-shaped ridges 57 so disposed that the forward flanks are steep, whereas the rearwardly extending flanks present relatively gentle slopes. At its rear end the grain pan 14 is mounted on cranks 58 (of which one only is shown in FIG. 6) of a crank shaft 59, while at its front end it is suspended by pivots or hinges 60 from links 61 which extend from a fixed supporting part 62. Thus when the shaft 59 rotates, it imparts reciprocatory motion to the collector grain pan 14, thereby causing the grain to travel in a forward direction on the pan.

The cleaning means 100' also comprises a first cleaning receptacle 63 which includes an upper sieve 64, and a second cleaning receptacle 64 which includes a lower sieve 66. The first receptacle 63 is suspended from a supporting member 67 attached to the frame 40 of the machine by two swing arms or levers 68, and from a shaped longitudinal section 69 of the frame by two other swing arms or levers 70 each having a pivot 71 attached to the frame.

The second receptacle 65 is also suspended from the frame 40 on the one hand by two swing arms or levers 72, and on the other hand by the swing arms 70 to which the second receptacle 65 is pivoted by pivots 73, whereas the first receptacle 63 is pivoted to the same swing arms 70 by pivots 74. The upper ends of both swing arms 70 are pivotally connected to one end of respective rods 75 the other end of which is pivotally connected to the grain pan 14. In this way it is obtained that, when the shaft 59 rotates, the swing arms 70 are caused to swing around their pivots 71, so as to impart reciprocatory motion in opposite directions to the first receptacle 63 and the second receptacle 65, respectively, on account of the pivots 73 of the lower shoe being located below the fixed pivots 71 of the swing levers 70, whereas the pivots 74 of the first receptacle 63 are located above the fixed pivots 71.

The second receptacle 65 also comprises a grain collecting pan 76 and a tailings collecting pan 77.

The clean grain proceeds to a grain gully or trough 78, to be displaced therein, through the action of a grain auger 18, towards one side of the machine, whence it is conveyed by the grain elevator 19 and then the conveyor 20 to the grain tank 21. The tailings in turn proceed to a tailings gully or trough 80 to be displaced therein, through the action of the tailings auger 22, towards the tailings elevator 23, the tailings finally being distributed by the tailings auger 24 in the rotors 8 and 9.

In front of, and underneath the grain pan 14, the transfer pan 15 is provided and is connected to the first receptacle 63 whereby it shares the movement thereof. The pan 15 has a step-shaped corrugations 82, the latter being shaped and located in such a way as to cause the grain thereon, when the first receptacle reciprocates, to be displaced towards the first receptacle 63. Preferably a rake 83 is provided rearwardly of the pan 15 to rake the grain as it passes to the first receptacle. As is usual, the cleaning means 100' also comprises the fan 17 with which is associated an outlet air channel 84 having guide or deflector blades 85.

As the grain elevator 19 has its upper end pointing in a forward direction, it is a simple matter for the operator to inspect, from his seated position, the purity of the grain by looking through an opening (not shown), which may be screened if necessary, provided in the head of that elevator.

DRIVE SYSTEM

Figure 12:
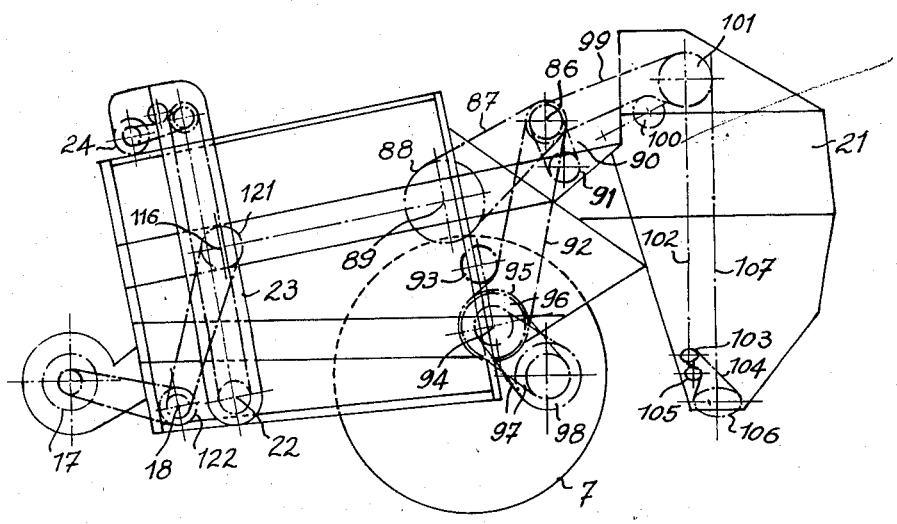
FIGS. 12 and 13 illustrate diagrammatically the general drive system for the combine.
Figure 13:
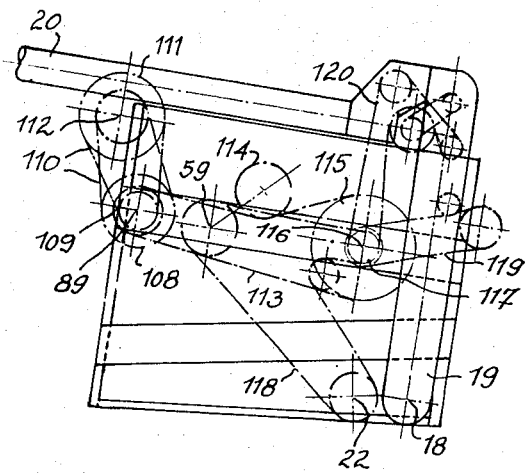

By way of an example only, a simplified schematic diagram of the drive system of the combine is shown in FIGS. 11 and 12. The engine, which as already stated, is located between the grain tank and the discharge ends of the threshing and separating units, has a drive shaft 86 provided with a plurality of pulleys. A first pulley drives a main power shaft 89 via a belt 87 and a pulley 88. Via a belt 90 and a pulley 91, a second pulley on the drive shaft 86 drives a hydraulic pump of the hydraulic system of the combine. A clutch and the gearbox of the combine are driven by a third pulley on the shaft 86, a belt 92, a clutch or switch device 93, a shaft 94 with a pulley 95 and one half of a variable transmission device 96–98 mounted thereon, a belt 97 and the other half of the variable transmission device. By means of a fourth pulley on the motor drive shaft 86, a belt 99, a clutch or switch 100 and a pulley 101 the grain discharge tube 25 is powered via a further transmission.

This further transmission mainly comprises a shaft 102 on which the pulley 101 is mounted as well as a chain or sprocket wheel 103 located at the lower end of the grain tank 21. By means of a chain 104 with a chain tensioner 105, the chain wheel 103 drives a further chain wheel 106 on a shaft 107 of the discharge auger.

The power shaft 89 extends underneath the separating concaves 12 towards the right-hand side of the combine, (as seen facing in the forward direction of movement), where one half of a variable transmission device 108–111 and a pulley 109 is mounted thereon. The variable transmission device comprising the halves 108 and 111 and a belt 110 drives an input shaft 112 for the rotors of the threshing and separating units.

By means of a belt 113 and a clutch 114, the pulley 109 drives a pulley 115 on a shaft 116. The latter shaft drives the cleaning unit 16, the grain pan 14, the fan 17, the grain and tailings conveying devices as well as the moving parts of the header 1 and the crop elevator 5. The shaft 59 of the cleaning unit, the tailings auger 22 and the other parts of the tailings return arrangement are driven by a pulley 117 via a belt 118. A chain transmission 119 is used for driving the moving parts of the header 1, whereas the grain elevator 19, the grain auger 18, the conveyor 20 and the grain distributing auger 49 are driven by a belt transmission 120. The shaft 116 extends towards the left-hand side of the combine, passing through the hollow support member 62, from which the collecting pan 14 is suspended. Finally, a pulley 121 is used for driving the fan 17 via a variable transmission device 122.

For convenience, reference has been made throughout the specification to grain and straw but it is to be understood that this is not intended to indicate any limitation of the ability of combines constructed in accordance with the invention.

What is claimed is:

1. In an axial flow combine having a main frame adapted to travel across a field, means for harvesting crop material, means mounted on the frame for conveying the crop material to the frame, means mounted on the frame for threshing and separating said crop material conveyed to said frame, the threshing and separating means extending longitudinally on said frame, wherein the improvement comprises: means mounted on the frame for cleaning said threshed and separated material comprising;

a first cleaning receptacle mounted directly below the threshing and separating means and adapted to receive said threshed and separated material, a second cleaning receptacle mounted directly below the first cleaning receptacle and which is adapted to receive a portion of said material contained on said first cleaning receptacle, means mounted forwardly and below said second cleaning receptacle for supplying and directing an air stream across both said first and second receptacles to remove any impurities contained in said material on said first and second receptacles, and means interposed between said threshing and separating means and said first receptacle for controlling the movement of said threshed and separated material received from said threshing and separating means as well as shielding said first receptacle from the draft generated by said threshing and separating means.

2. An axial flow combine as described in claim 1 wherein said controlling means includes a first controlling means mounted directly below and inclined towards the front of said combine, the first controlling means extending along the entire length of said threshing and separating means and interposed between said threshing and separating means and said first cleaning receptacle to shield said first receptacle from the draft generated by said threshing and separating means;

a second controlling means mounted forwardly of said first controlling means and having a portion extending below said first controlling means, the second controlling means being inclined slightly toward the rear of said combine, and means operably associated with both said first and second controlling means to reciprocate both said first and second controlling means to assist the movement of said material on both said first and second controlling means.

3. An axial flow combine as described in claim 2 wherein said second controlling means includes mens for dispersing said material as it leaves said second controlling means.

4. An axial flow combine as described in claim 1 wherein said controlling means include impervious members mounted below said threshing and separating means in such a way as to prevent air generated by said threshing and separating means from proceeding towards either said first or second cleaning receptacle thereby eliminating any interference with the cleaning operation.

5. An axial flow combine as described in claim 4 wherein the impervious members have directing members mounted thereon to aid in guiding and directing said material while on said impervious members to desired positions during the crop material cleaning operation.

6. An axial flow combine as described in claim 1 wherein both said first and second cleaning receptacles have pervious sections.

7. An axial flow combine as described in claim 6 wherein the pervious sections of both said first and second cleaning receptacles contain apertures, the apertures of said first receptacle being larger than the apertures of said second receptacle thereby permitting material having a larger area to pass through said first pervious section than said second pervious section.

8. In an axial flow combine having a main frame adapted to travel across a field, means for harvesting crop material, means mounted on said frame for conveying the crop material to the frame, means on the frame for threshing and separating said crop material conveyed to said frame, the threshing and separating means extending longitudinally on said frame, wherein the improvement comprises: a means mounted on said frame and disposed directly below said threshing and separating means for cleaning the threshing and separated material, the cleaning means comprising a. means mounted directly below and extending along the length of said threshing and separating means for controlling the movement of said threshed and separated material, the controlling means including impervious members mounted below said threshing and separating means to prevent air generated by said threshing and separating means from interferring with the cleaning operation, b. a first cleaning receptacle mounted directly below said controlling means and having a pervious section adapted to receive said material contained on said controlling means, c. a second cleaning receptacle mounted directly below the first receptacle and having a pervious section adapted to receive a portion of said material contained on said first receptacle, and d. means mounted at an extreme forward position on said combine and below the second receptacle for supplying and directing an air stream across both said first and second receptacles to remove any impurities contained in said material on said first and second receptacles.

9. An axial flow combine as described in claim 8 wherein the air supplying and directing means comprises a blower mounted at the forwardmost portion of said combine in front of and below both said first and second receptacles.

* * * * *